(12) United States Patent
Rachlin (10) Patent No.: US 8,384,515 B2
(45) Date of Patent: Feb. 26, 2013

(54) BIOMETRIC PROCESSING USING RANDOM PROJECTION TRANSFORMS

(75) Inventor: Yaron Rachlin, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 1030 days.

(21) Appl. No.: 12/210,694

(22) Filed: Sep. 15, 2008

(65) Prior Publication Data
US 2010/0066493 A1 Mar. 18, 2010

(51) Int. Cl.
*G05B 19/00* (2006.01)
(52) U.S. Cl. .................................................. 340/5.82
(58) Field of Classification Search .............. 340/5.82, 340/3.1; 235/380; 705/44; 713/186
See application file for complete search history.

(56) References Cited

U.S. PATENT DOCUMENTS

| | | | |
|---|---|---|---|
| 6,836,554 B1 | 12/2004 | Bolle | |
| 7,120,607 B2 | 10/2006 | Bolle et al. | |
| 7,271,747 B2 | 9/2007 | Baraniuk et al. | |
| 2003/0115148 A1* | 6/2003 | Takhar ........................... | 705/64 |
| 2006/0048038 A1 | 3/2006 | Yedidia et al. | |
| 2006/0123239 A1 | 6/2006 | Martinian et al. | |
| 2006/0123241 A1 | 6/2006 | Martinian et al. | |
| 2007/0174633 A1 | 7/2007 | Draper et al. | |

FOREIGN PATENT DOCUMENTS

| | | |
|---|---|---|
| EP | 0986209 A2 | 3/2000 |
| EP | 1927934 A2 | 6/2008 |
| WO | 2006/044917 A2 | 4/2006 |

OTHER PUBLICATIONS

Search Report: European Patent Application No. 09170224.1-2212; dated Feb. 8, 2010.
Search Report: European Patent Application No. 09170229.0-2212; dated Jan. 29, 2010.
"Noiseless Coding of Correlated information Sources", Slepian D. et al, IEEE Transactions on Information Theory, IEEE, US., vol. IT-19, No. 4, Jul. 1, 1973, pp. 471-480, XP008070971.
"Enhancing Security and Privacy in Biometrics-Based Authentication Systems", IBM Systems Journal, IBM Corp., Armonk, NY, vol. 40, No. 3, Jan. 1, 2001, pp. 614-634, XP001116337.
"Experiments with Random Projection", Sanjoy Dasgupta, Internet Citation, Jan. 1, 2000, XP007911117, Retrieved from the Internet: URL: http://yaroslavvb.com/papers/dasguptaexperiments.pdf> [Retrieved on Oct. 13, 2010] pp. 1-4.
"A Comparison of Dimensionality Reduction Techniques for Text Retrieval", Vinay V. et al, Machine Learning and Applications, 2005, Proceedings. Fourth International Conference on Los Angeles, CA Dec. 15-17, 2005, Piscataway, NJ, IEEE, Dec. 15, 2005, pp. 293-298, XP010902781.

(Continued)

*Primary Examiner* — Vernal Brown
(74) *Attorney, Agent, or Firm* — Vedder Price P.C.

(57) ABSTRACT

To provide cancelable biometrics, random projection transforms are used to produce transformed biometric data that may be used for authentication purposes. Each random projection transform provides a one-way or irreversible transformation such that the resulting transformed biometric data alone cannot be used to reconstruct the biometric data. Enrollment and backup transforms are produced based on enrollment biometric data. Authentication is possible by similarly transforming authentication biometric and then securely reconstructing the enrollment and authentication biometric data for comparison. In a similar manner, the enrollment and backup transforms may be used to reenroll biometric data when its corresponding transformed biometric data is compromised without requiring further user intervention.

43 Claims, 6 Drawing Sheets

OTHER PUBLICATIONS

"Random Projection in Dimensionality Reduction: Applications to Image and Text Data", Ella Bingham and Heikke Mannila Ed, Association for Computing Machinery, Proceedings of the 7th, ACM SIGKDD, International conference on Knowledge Discovery and Data Mining, KDD-2001, San Francisco, CA Aug. 26-29, 2001; International conference on Knowledge Discovery and Data Mining, New York, NY; ACM, Aug. 26, 2001; pp. 245-250, XP007911116.

"Sparse Random Projection for Efficient Cancelable Face Feature Extraction", Kim Younsung et al., Industrial Electronics and Applications, 2008, ICIEA 2008, 3rd IEEE Conference, ON, IEEE, Piscataway, NJ, Jun. 3, 2008, pp. 2139-2144, XP031294105.

"Generating Cancelable Fingerprint Templates", Ratha, Chikkerur, Connell, and Bolle, IEEE Transactions on Pattern Analysis and Machine Intelligence, vol. 29, No. 4, Apr. 2007, pp. 561-572.

"A Face is Exposed for AOL Searcher No. 4417749", The New York Times, Aug. 9, 2006, found at: http://www.nytimes.com/2006/08/09/technology/09aol.html?_r=1&ex=1312776000&oref=s . . . .

"Compressive Sensing", Richard Baraniuk, Rice University, Lecture Notes in IEEE Signal Processing Magazine, vol. 24, Jul. 2007.

"Tutorial on Compressive Sensing", Richard Baraniuk, Justin Romberg, Michael Wakin, powerpoint presentation.

Search and Written Opinion issued in EP Application No. 12190181.3-2212 on Dec. 4, 2012.

* cited by examiner

- PRIOR ART -

FIG. 1

- PRIOR ART -

- PRIOR ART -

BIOMETRIC PROCESSING USING RANDOM PROJECTION TRANSFORMS

FIELD OF THE INVENTION

The instant disclosure relates generally to biometric systems and, in particular, to processing of biometric data using random projection transforms.

BACKGROUND OF THE INVENTION

Recently, the various advantages of biometric data—representations of various innate physical characteristics of a person, such as the structure of his/her face, fingerprints, retinal pattern, voice, vein patterns, etc.—have led to numerous efforts to develop biometric-based verification or security applications. Properties having particular value are the uniqueness (i.e., relatively low likelihood of two people sharing confusingly similar biometric characteristics) and usability (i.e., innate characteristics eliminate need to manage multiple tokens or passwords) of biometric data. However, a significant shortcoming of biometric data is summarized by the observation, noted in the literature, that biometrics are identifiers, not secrets.

Stated another way, unlike tokens or keywords, where security is provided by the fact that they are secrets known only to the user (absent inadvertent or illicit disclosure), biometric data is not secret. That is, biometric data can be readily recorded by attackers, e.g., an image of a person's face or recording of a person's voice can be surreptitiously captured, latent fingerprints can be scanned, etc. A significant consequence of lost biometric data is that once compromised, it becomes compromised forever. Unlike secret passwords or tokens, compromised biometric data cannot be canceled or revoked, e.g., you can't issue someone new fingerprints. Given the relative scarcity of available biometric data for a person, compromise of even a single characteristic used for authentication/security purposes could be catastrophic.

Recognizing this limitation, various techniques for the production of cancelable or revocable biometrics have been proposed. Generally, these techniques apply an irreversible or one-way transform to biometric data. The resulting transformed biometric data may then be used for authentication/security purposes instead of the actual biometric data. If the transformed biometric data ever becomes known to an attacker, the one-way transform prevents it from being used to reconstruct (or, ideally, even provide a reasonable estimate of) the original biometric data. However, unlike actual biometric data, if the transformed biometric data is compromised, it can be canceled and a new transformed biometric issued using a new one-way transform. In short, the transformed biometric data becomes more like a password or token. One technique that could be employed for this purpose is to use known encryption techniques to encrypt biometric data. However, encryption techniques suffer from the sometimes difficult problem of key management, and the potential for compromise if the key is lost. Furthermore, the computation overhead associated with many encryptions systems is substantial.

In another technique, cancelable biometrics are produced by applying distorting transformations to the biometric data or domain-transformed versions thereof. According to this technique, various values within the biometric data are permuted or otherwise scrambled in a known, repeatable fashion. In particular, specific features of the biometric data are selected, e.g., minutiae of a fingerprint in a spatial domain or frequency peaks of a voice sample in a frequency domain, for application of the distortion. Without knowing the specific distortion pattern applied to the biometric data, it becomes difficult to undo the distortion. In a most secure variation, the applied distortion actually causes irretrievable loss of some biometric data, e.g., through mapping of various biometric features onto each other thereby making it impossible to determine the original configuration of the biometric features. By applying the identical distortion to correlated biometric data (e.g., a fingerprint taken during an enrollment phase versus the same fingerprint recorded during an authentication attempt), it remains possible to compare the distorted versions of the biometric data to provide verification. In the event that distorted biometric data is compromised, new biometric data may be obtained and a new distortion applied. However, the privacy provided by the distorted biometric data (in the case of lossless distortion) is questionable given that large portions of the original biometric data are either not distorted at all or are only minimally distorted such the reconstruction may still be possible even without knowledge of the original distortion function. Furthermore, in the case of lossy distortion, where some of the features of the biometric data are permanently lost, utility of the biometric data, i.e., uniqueness of the biometric data relative to its provider, may be impaired.

Figure 1:
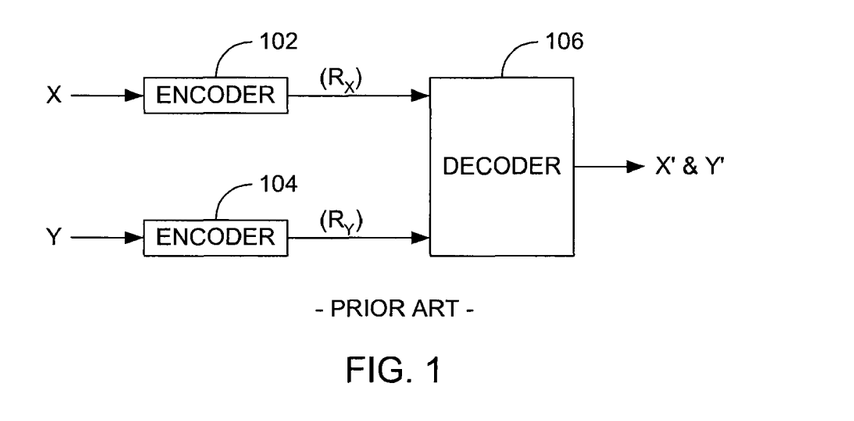
FIG. 1 is a block diagram of a distributed source coding system in accordance with prior art techniques.
Figure 2:
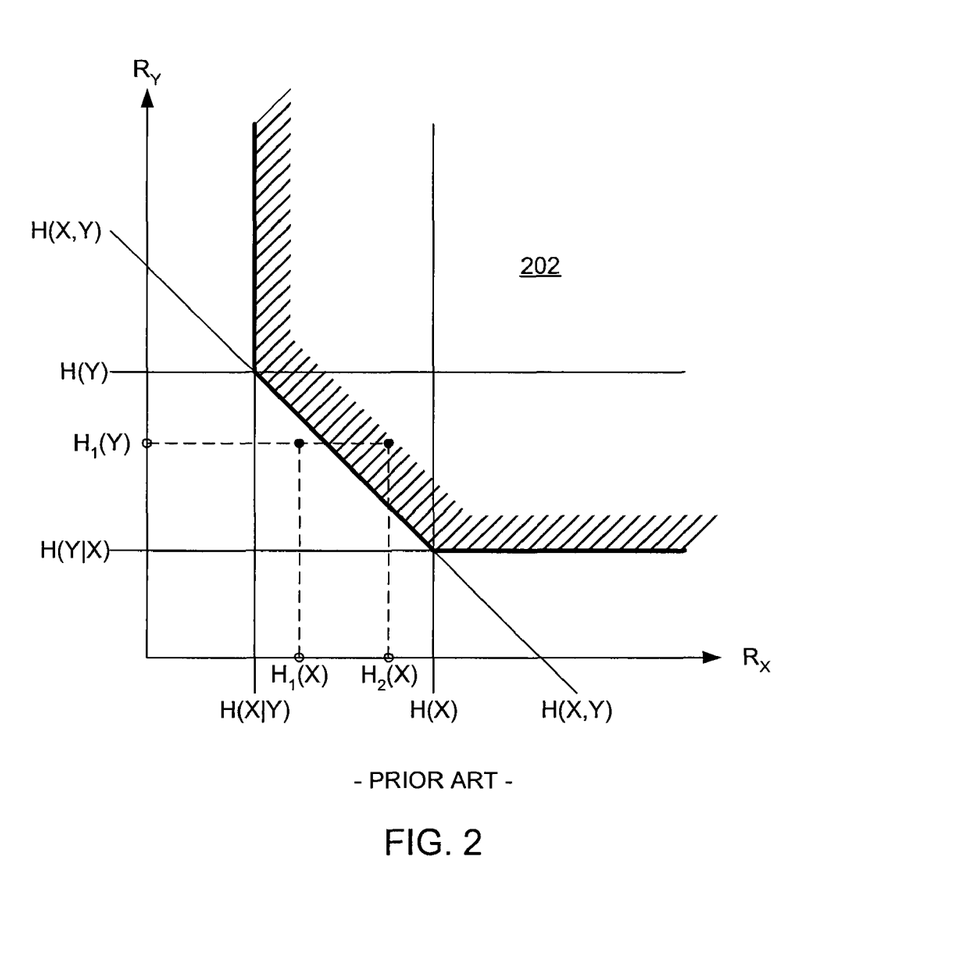
FIG. 2 is a graph illustrating the theoretical compression limits applicable to distributed source coding systems like that illustrated in FIG. 1.

Other approaches have been recently developed. For some time, researchers have appreciated the theoretical utility of a construct known as Slepian-Wolf coding or distributed source coding (DSC). The basic concepts of DSC are illustrated with reference to FIGS. 1 and 2. As shown in FIG. 1, two correlated signals, X and Y, are encoded 102, 104 and transmitted at bit rates $R_X$ and $R_Y$, respectively, to a decoder 106 that jointly decodes X' and Y'. Note that the signals, X and Y, although correlated, come from sources that have no "knowledge" of each other, i.e., they are distributed. Slepian and Wolf established the theoretical limits for the minimum encoding rate required such that X and Y can still be recovered perfectly. This is illustrated in FIG. 2, where the various potential encoding bit rates, $R_X$ and $R_Y$, are illustrated along the respective horizontal and vertical axes. As known in the art, the entropy of a discrete random variable, H(X), is representative of the minimum amount of information needed to reconstruct a message, e.g., a string of bits, generated according to the random variable. In this sense, entropy is an expression of the limit to which a message can be compressed without loss of information. Rates $R_X$ and $R_Y$ above H(X) and H(Y), respectively, (as illustrated by the upper right quadrant 202) are always sufficient to reconstruct X and Y. Slepian and Wolf demonstrated that the decoder 106 could further reconstruct X and Y perfectly if:

$$R_X + R_Y \geq H(X,Y) \qquad \text{Eq. 1}$$

$$R_Y \geq H(Y|X) \qquad \text{Eq. 2}$$

$$R_X \geq H(X|Y) \qquad \text{Eq. 3}$$

These boundaries are illustrated in FIG. 2 by the heavy line and delineate a region above the boundary in which the respective code rates $R_X$ and $R_Y$ are sufficient to provide perfect reconstruction of X and Y. In other words, the Slepian-Wolf boundary establishes exact reconstruction so long as the sum of the encoding rates of X and Y is greater than their joint entropy, H(X,Y), and that given the correlation of the sources, the minimum encoding rate for X is limited by the conditional entropy H(X|Y) and, conversely, the minimum encoding rate for Y is limited by the conditional entropy H(Y|X). Intuitively, this means that the correlation of the respective sources can be exploited to transmit X and Y at rates less than their independent entropy limits. Two examples of this are illustrated in FIG. 2. In the first example, X is encoded at a rate $H_1(X)$, where $H(X|Y)<H_1(X)<H(X)$, and Y is encoded at a rate $H_1(Y)$, where $H(Y|X)<H_1(Y)<H(Y)$. Although $H_1(X)$ and $H_1(Y)$ satisfy Eqs. 2 and 3 above, they do not satisfy Eq. 1 and the decoder 106 cannot exactly reconstruct X and Y. However, in the second example, Y is encoded as before, but X is encoded at a rate $H_2(X)$, where $H(X|Y)<H_1(X)<H_2(X)<H(X)$. In this case, Eq. 1 is now satisfied and exact reconstruction is possible. Note that, although the explanation above concerned two correlated sources, the same principles still apply to a more general case in which J correlated sources (J>2) and encoders are used.

The concept of Slepian-Wolf coding has only recently inspired attempts to employ its principles for authentication purposes based on biometric data. For example, techniques have been proposed in which so-called syndromes codes (perhaps best known for their utility as part of channel coding or error correction schemes) are used during an enrollment phase as one-way transformations of biometric data. The syndromes (and hash values based thereon) are stored and subsequently used during an authentication process in which the syndrome is decoded using additional biometric data, received at the point of authentication, to produce an estimate of the original biometric data and/or the hash value. Thereafter, comparison of the hash values (or the authentication and reconstructed biometric data using conventional biometric comparison techniques) may be performed to authenticate the user. While this technique aspires to adhere to Slepian-Wolf principles, in fact, it does not employ the use of jointly compressed, distributed biometric data sources to the extent that the authentication biometric data is never compressed and is, instead, directly compared (or used to develop a hash value that is compared) at the point of authentication. In short, this technique does not perform joint decoding. Furthermore, these techniques fail to provide a realistic solution for the provision of cancelable biometric data. While the syndrome encoding does result in a one-way transformation of the biometric data, the complexity of generating such codes makes it unreasonable to expect that new syndrome codes could be applied every time transformed biometric data is compromised. Stated another way, syndrome coding is not readily scalable to providing a robust, cancelable biometric solution.

Thus, techniques for producing cancelable biometrics that overcome the limitations of prior art techniques would represent a significant advancement.

SUMMARY OF THE INVENTION

The instant disclosure describes technique for providing cancelable biometrics. In particular, the instant disclosure describes the use of random projection transforms to produce transformed biometric data that may be used for authentication purposes. Random projection transforms that are incoherent relative to a basis in which biometric data is sparse (e.g., in a time- or spatial-domain or transform thereof) are preferably employed. Each random projection transform provides a one-way or irreversible transformation such that the resulting transformed biometric data alone cannot be used to reconstruct the biometric data. In one embodiment, an enrollment random projection transform is used to transform enrollment biometric data into transformed enrollment biometric data, whereas a backup random projection transform numerically/structurally different from but statistically equivalent (in the sense of incoherence relative to a basis of the biometric data) to the enrollment random projection transform is used to transform the enrollment biometric data into transformed backup biometric data. The transformed enrollment and backup biometric data, and the random projection transforms used to produce them, are subsequently stored, in association with an identification of the enrolling user, in respective authentication and backup databases. Preferably, any desired level of security (e.g., encryption, limited and secure access, etc.) can be applied to either or both of the databases in order to maintain the transformed biometric data and corresponding random projection transform as secrets.

In another embodiment, authentication biometric data is obtained from an authenticating user and used to produce transformed authentication biometric data upon application of an authentication random projection transform. The authentication random projection transform need not (indeed, to preserve security, should not) be identical to the enrollment random projection transform. Based on an identification of an enrolled user targeted by the authentication attempt (or through a search of potentially matching enrolled users), an enrollment random projection transform and transformed enrollment biometric data are obtained from the authentication database. Using know techniques, such as linear programming, reconstructed enrollment biometric data and reconstructed authentication biometric data are determined based on the transformed enrollment biometric data, the transformed authentication biometric data, the enrollment random projection transform and the authentication random projection transform. The reconstructed enrollment and authentication biometric data is then compared, using any suitable biometric comparison technique, to provide an authentication decision, i.e., whether the authenticating user is the enrolled user as determined by similarity (or lack thereof) of the reconstructed biometric data.

In the event that either the transformed enrollment biometric data or the enrollment random projection transform for a given enrolling user (but not both) is compromised, i.e., becomes known to an attacker, then the compromised data/transform may be marked as invalid or otherwise revoked to prevent its further use. In another embodiment, the compromised user may be re-enrolled without having to submit new enrollment biometric data. To this end, the transformed enrollment and backup biometric data and the enrollment and backup random projection transform for the enrolling (and now compromised) user are obtained and used to provide reconstructed biometric data using the same techniques used for the authentication process. Thereafter, the reconstructed biometric data is re-encoded using a reenrollment random projection transform (once again, structurally different but statistically identical to the other random projection transforms). Thereafter, the resulting transformed reconstructed biometric data and the reenrollment random projection transform are stored in another authentication database. Note that this same reenrollment process may be repeated as necessary so long as at least one version of transformed biometric data and its corresponding random projection transform is maintained in secrecy. Further still, as with the Slepian-Wolf construct, any of the embodiments described herein may be generalized into J different pieces (J>2) distributed across multiple databases, thereby providing an additional degree of security.

Using these techniques, cancelable biometrics may be readily provided that do not suffer from the shortcomings of prior art techniques.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 3:
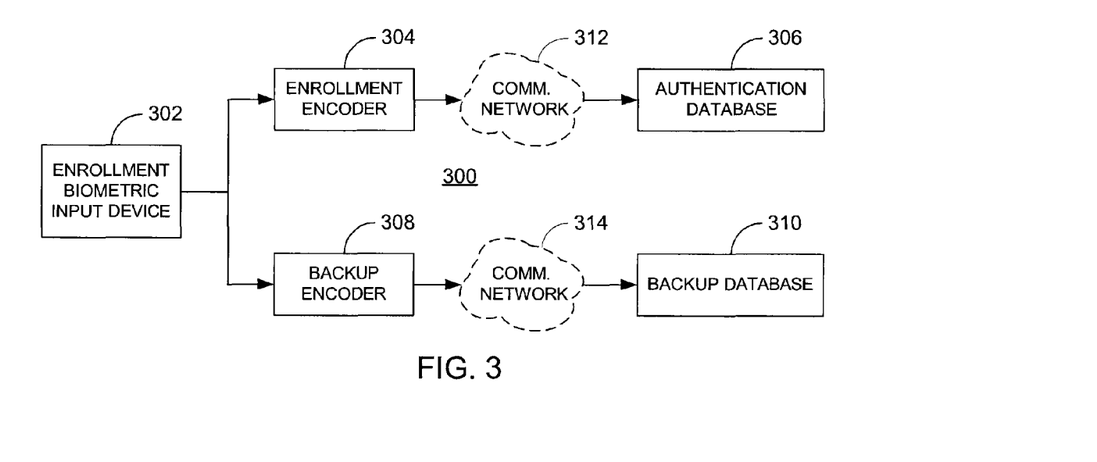
FIG. 3 is a schematic block diagram of a representative system for processing enrollment biometric data in accordance with an embodiment of the instant disclosure.

Referring now to FIG. 3, a representative system 300 for processing enrollment biometric data is illustrated. In particular, the system 300 comprises an enrollment biometric input device 302 in communication with an enrollment encoder 304 that, in turn, is in communication with an authentication database 306, optionally via a communication network 312. Additionally, the enrollment biometric input device 302 is in communication with a backup encoder 308 that, in turn, is in communication with a backup database 310, optionally via another communication network 314. The enrollment biometric input device 302 may comprise any type of reader capable of obtaining a suitable representation (preferably, digital) of a biometric characteristic of an enrolling user. For example, the input device 302 may comprise a fingerprint reader, a camera for capturing an image of a person's face, a retinal scanner for capturing an image of a person's retina, a recorder for capturing a recording of a person's voice or a scanner capable of obtaining an image of person's vein pattern at a readily accessible portion of a person's anatomy. Typically, such input devices attend to proper registration of the biometric characteristic (i.e., alignment of fingerprint or facial images, etc.) during capture, but as known in the art, could also be performed by other devices not shown. Furthermore, still other types of input devices 302 may be used for this purpose and the instant disclosure is not limited in this regard. For example, rather than a device that measures/records a person's biometric, the input device 302 may comprise a storage device, such as an optical or magnetic memory and appropriate reader, in which the biometric data (previously obtained by another device not shown; potentially encrypted or otherwise protected) is stored.

Regardless of the manner or form in which it is obtained, the enrollment biometric data is provided to the enrollment encoder 304 and the backup encoder 308. Although not shown in FIG. 3, the biometric data sent to the encoders 304, 308 may be encrypted, or both the input device 302 and encoders 304, 308 may be placed in a trusted environment to prevent compromise of the otherwise unprotected biometric data. While it is preferred to provide the enrollment biometric data to both the enrollment encoder 304 and the backup encoder 308, thereby minimizing the number of biometric measurements to be provided by the enrolling user, this is not a requirement. That is, separate biometric input devices may be employed such that one input device is used for the enrollment encoder 304, whereas another biometric input device is used for the backup encoder 308. In this situation, it is necessary to ensure that the separate biometric data provided to each encoder 304, 308 corresponds to the same enrolling user, for example, through the use of a suitable user identification.

As those of ordinary skill in the art will appreciate, the biometric data obtained by the input device 302 may comprise the actual measured biometric data or a feature vector extracted therefrom, depending on the complexity and capabilities of the input device 302. For example, in one embodiment, the biometric data provided to the encoders 304, 308 may comprise the actual measured biometric data, which the encoders 304, 308 may encode directly or use as a basis for extracting a biometric feature vector that is subsequently encoded. Alternatively, the input device 302 may encompass the necessary processing to output a biometric feature vector directly. Techniques for extracting feature vectors from measured biometric data are well known in the art and need not be described in further detail here. As used herein, the term "biometric data" refers to either representation form (directly measured or feature vector).

Figure 4:
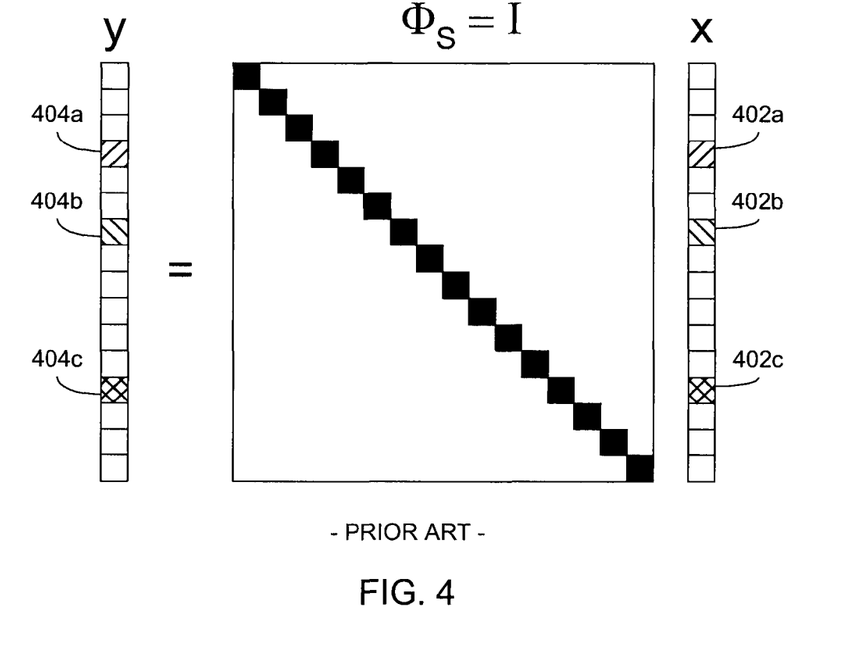
FIG. 4 is an illustration of sampling techniques used in conventional systems to represent sparse biometric data.

In accordance with one embodiment, both the enrollment and backup encoders 304, 308 employ a random projection transform (RPT) to provide one-way encoding of the biometric data. The concept of an RPT is described with further reference to FIGS. 4 and 5. In conventional systems, a digital representation of a signal (e.g., a biometric input) is provided by sampling the input signal at a sampling rate sufficiently high enough to ensure adequate reconstruction of the input signal. This is illustrated in FIG. 4 in matrix form where an input signal, x, represented by an (N×1) vector, is processed by an (N×N) sampling function, $\Phi_S$, to produce an output signal, y, also illustrated as an (N×1) vector. In this case, the sampling function is equivalent to the identity matrix where N is of sufficient dimension to ensure a proper sampling rate. A significant feature of many biometric inputs is the scarcity of the signal, i.e., a relatively small number (K) of non-zero (or nearly-zero) values 402 relative to the basis in which it is sampled. For example, an image in a spatial domain or a voice segment in a time domain may be relatively non-sparse (i.e., relatively large proportion of non-zero values) whereas, in the frequency domain, both may be sparse. In conventional sampling techniques, the sampling function is selected according to a worst-case scenario (i.e., at or above the so-called Nyquist rate) needed to guarantee faithful reproduction of the input signal. As a result, the output signal, y, is equally sparse as the input signal and fails to take advantage of compression opportunity offered by the input signal's sparsity.

Figure 5:
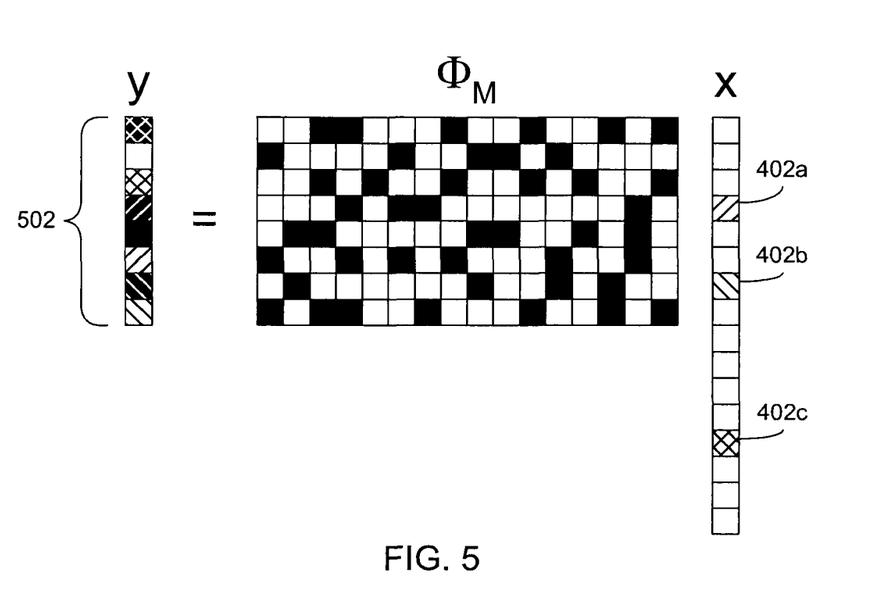
FIG. 5 is an illustration of a compressed sensing technique in which measurements are employed to represent sparse biometric data.

More recently, so-called compressive sensing has been developed to take advantage of the compressibility of sparse signals. This is illustrated in FIG. 5 where the sampling function, $\Phi_S$, is replaced by a measurement function, $\Phi_M$, that comprises an (M×N) matrix, where M<N, composed of random values. Note that, as illustrated, the measurement function comprises randomly chosen binary values, i.e., ones or zeroes. However, in practice, the values in the measurement function may be selected on another random basis, e.g., random Gaussian values. Regardless, the measurement function should be incoherent relative to the basis in which the input signal is sparse, i.e., sparse vectors in the signal basis should not be sparse in the basis of the measurement matrix. Thus, to the extent that the input signal has some structure to it, a random measurement function will suffice. In essence, rather than producing individual, "local" samples of the input signal, the measurement function produces M "global" measurements that effectively spread out the contribution of the sparse content 402 of the input signal across the M measurements 502 while simultaneously preserving structure and information. So long as M is chosen sufficiently large enough (i.e., $M \propto K \log (N/K)$), the original input signal, x, can be reconstructed exactly with high probability using conventional optimization techniques, such as linear programming. Generally, well-known linear programming techniques determine the best outcome (in the form of a maximized or minimized value) given requirements represented as linear equations. In the context of the instant disclosure, linear programming determines the best fit reconstructed input signal given the output signal and the measurement function.

In the context of cancelable biometric data and building upon the principles of Slepian-Wolf coding, the encoders described herein (i.e., the enrollment and backup encoders 304, 308, the authentication encoder 608 of FIG. 6 and the reenrollment encoder 704 of FIG. 7 described below) provide a one-way or irreversible transformation of biometric data by meeting the entropy boundaries of Slepian-Wolf without exceeding the "normal" entropy boundary, H(X), for each measured biometric. Stated another way, as used herein, the number of measurements, $m_x$, provided by the measurement function $\Phi_X$ for any encoder of a first biometric, X, is chosen such that it does not exceed H(X) and, likewise, the number of measurements, $m_y$, provided by the measurement function $\Phi_Y$ for any encoder of a second, correlated biometric, Y, is chosen such that it does not exceed H(Y). It should be noted that, in practice, entropy values of complex signals are typically estimated rather than calculated. For example, various biometric types, e.g., images of irises or voice recordings, may have their entropies empirically characterized as a class. In turn, then, the number of measurements needed may be likewise empirically determined based on appropriate assumptions, by biometric type, about signal sparsity and joint signal sparsity. Acknowledging these real-world implementation issues, in combination, the measurements of X and Y nevertheless ideally satisfy the Slepian-Wolf conditions of Eqs. 1-3, i.e.:

$$m_x + m_y \geq H(X,Y) \quad \text{Eq. 4}$$

$$m_y \geq H(Y|X) \quad \text{Eq. 5}$$

$$m_x \geq H(X|Y) \quad \text{Eq. 6}$$

Measurement functions $\Phi_X$ and $\Phi_Y$ (or more generally, $\Phi_i$, where i=1 to J in the case where J different, but correlated, biometric signals are transformed) meeting these requirements—i.e., sufficiently incoherent to a basis in which biometric signals are sparse and meeting the Slepian-Wolf conditions without being reversible—are referred to herein as random projection transforms (RPT). Note that the above results hold true where $\Phi_X$ and $\Phi_Y$, although statistically equivalent (in the incoherence sense), are not numerically identical. This is a particularly powerful property when applied to biometric data because security is enhanced where different transforms may be applied to each biometric signal without loss of functionality.

Referring once again to FIG. 3, the enrollment decoder 304 encodes the enrollment biometric data using an enrollment RPT whereas the backup encoder 308 encodes the enrollment biometric data using a backup RPT that is not identical to the enrollment RPT. It should be noted that, in one embodiment, both encoders 304, 308 are implemented using software programming techniques, i.e., executable instructions stored on a suitable storage device that are executed by one or more processing devices (or processors), to implement the processing described herein. As known in the art, such processing devices may comprise microprocessors, microcontrollers, digital signal processors, co-processors or combinations thereof, as a matter of design choice. Suitable platforms including such processing devices include conventional computing devices such as desktop/laptop/handheld computers, server computers and the like. Of course, such computing devices may include various peripheral devices typically associated therewith, i.e., displays, user input mechanisms, network interfaces, etc. Furthermore, the processing described herein can be implemented in hardware using appropriately configured application-specific circuits, programmable logic arrays, state machines, etc. Further still, the processing described herein can be implemented using a combination of hardware and software implementations, as known to those having ordinary skill in the art, as a matter of design choice. In one embodiment, the enrollment decoder 304 and the backup encoder 308 are implemented using separate, non-co-located computing devices.

Regardless of their implementation, the encoders 304, 308 provide the respective transformed enrollment biometric data and the transformed backup biometric data to corresponding databases 306, 310 where they are stored in conjunction with an identification of the enrolling user. Additionally, the enrollment RPT and the backup RPT are associatively stored with their corresponding transformed enrollment biometric data and transformed backup biometric data in the authentication database 306 and the backup database 310, respectively. In this manner, the respective transformed biometric data and corresponding RPT may be indexed according to the enrolled user's identification for subsequent use, as described below.

The encoders 304, 308 may communicate with their corresponding databases 306, 310 directly, as in the case where the encoders and databases are deployed within a trusted environment. Alternatively, the encoders may communicate with their corresponding databases via the intervening networks 312, 314, which may comprise separate networks or the same network. In practice, the networks 312, 314 may comprise a public communication network, such as the Internet or World Wide Web, or private (but nevertheless unsecured) communication network such as a local area network, or combinations of public and private network elements. Further still, the networks 312, 314 may comprise wired or wireless network elements as known to those having ordinary skill in the art. Note that, although not illustrated in FIG. 3, it may be desirable for any data or information communicated between the encoders and the databases to be encrypted to enhance security, although, as noted herein, one of the advantages of the one-way encoding is that knowledge of any single piece of information used in or resulting from the encoding process is insufficient to reconstruct sensitive biometric data.

Figure 6:
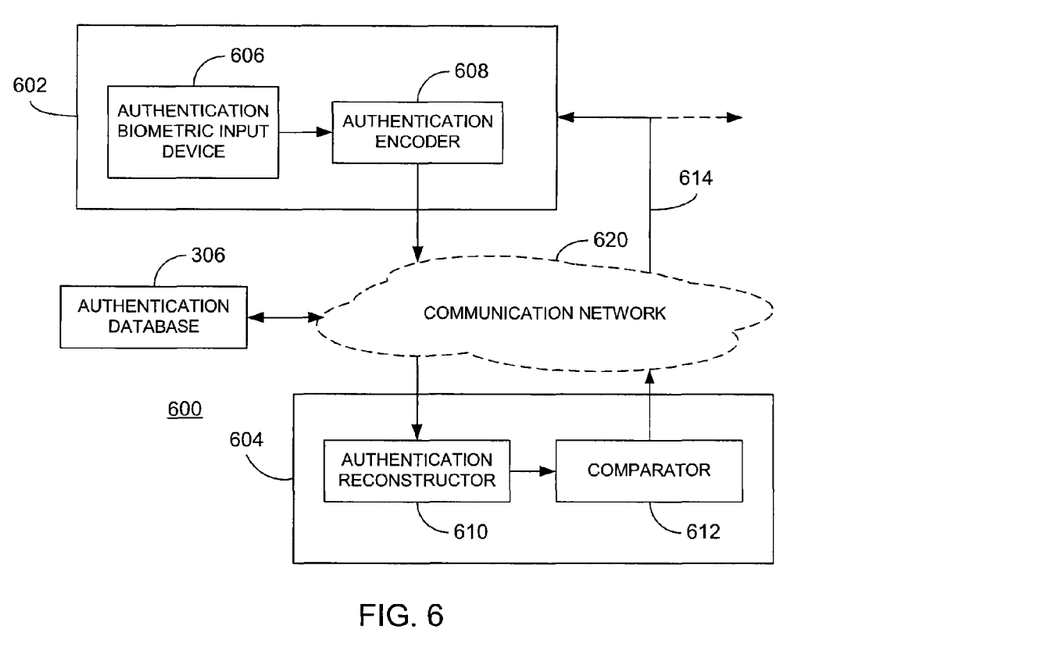
FIG. 6 is a schematic block diagram of a representative system for processing authentication biometric data in accordance with an embodiment of the instant disclosure.
Figure 7:
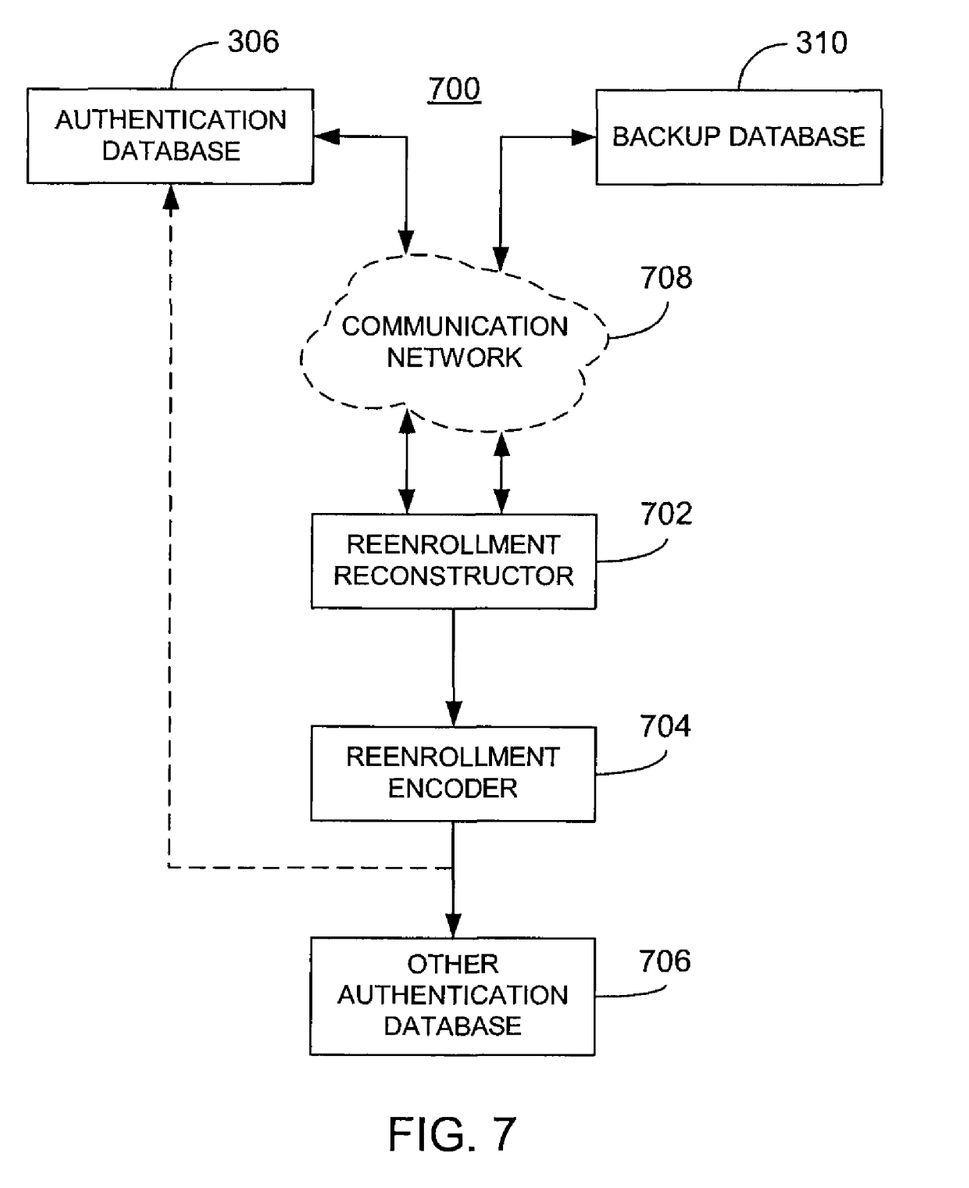
FIG. 7 is a schematic block diagram of a representative system for processing transformed biometric data for reenrollment in accordance with an embodiment of the instant disclosure.

Referring now to FIG. 6, a representative system 600 for processing authentication biometric data is illustrated. In particular, the system 600 comprises an authentication requestor 602 in communication with an authenticator 604, optionally via an intervening network 620. Typically, the authentication requestor 602 is attempting to verify the identity of an authenticating user as a previously enrolled user. As such, the authentication requestor 602 will often be deployed at a location where authentication is desired (e.g., an automated bank teller, security access point, purchase register, etc.), which location is likely to be remote relative to the location of the authenticator 604. Thus, the authenticator 604 is operative to verify the identity of the authenticating user through comparison of biometric data, in a secure fashion.

To this end, the authentication requester 602 comprises an authentication biometric input device 606 in communication with an authentication encoder 608. In practice, the authentication biometric input device 606 may be substantially identical to the enrollment biometric input device 302, described above. That is, the authentication biometric input device 606 should be operative to obtain the same type of biometric data as obtained by the enrollment biometric input device 302.

The authentication encoder 608, which may be implemented using similar techniques described above relative to the enrollment and backup encoders 304, 308 (including the optional encryption/trusted environment security features), takes as input the authentication biometric data received from the input device 606. Note that, in keeping with Slepian-Wolf coding, the authentication biometric data represents a correlated source (i.e., time-shifted) relative to the enrollment biometric data. Using an authentication RPT that is not equivalent to either the enrollment RPT or the backup RPT, the authentication encoder 608 encodes the authentication biometric data to provide transformed authentication biometric data. As before, the encoding performed by the authentication encoder 608 is one-way; knowledge of the transformed authentication biometric data alone is insufficient to reconstruct the authentication biometric data. Although not shown, the authentication requestor 602 is operative, in an embodiment, to receive an identification of an enrolled user to be targeted by the authentication attempt, such as an alphanumeric code or other unique identifier known to those having ordinary skill in the art. Note that in an identification application, as opposed to an authentication application as described above, a user presents biometric data without an associated identifier and requests to be identified through comparison against a database for potential matches. In this case, an identification of an enrolled user will not be received.

Regardless, the resulting transformed authentication biometric data and the authentication RPT, possibly along with the identification of the enrolled user, are subsequently sent to the authenticator 604 (potentially in an encrypted form to enhance security). In one embodiment, this may done in the form of a request for authentication services. As before, the communication network 620 may comprise a public or private network or a combination of elements thereof. Upon receiving this information from the authentication requestor 602, the authenticator 604 transmits the identification of the enrolled user to the authentication database 306 along with a request for the enrollment information (i.e., the enrollment RPT and the transformed enrollment biometric data) associated with that identification. Based on the identification of the enrolled user, the authentication database 306 locates the requested enrollment information and sends it back (possibly, once again, in an encrypted form) to the authenticator 604.

As shown, the authenticator 604 comprises an authentication reconstructor 610 that takes as input, the enrollment RPT ($\Phi_E$), transformed enrollment biometric data ($y_E$), the authentication RPT ($\Phi_A$) and the transformed authentication biometric data ($y_A$) and implements an optimization algorithm, i.e., linear programming, to provide reconstructed enrollment biometric data ($x_E$) and reconstructed authentication biometric data ($x_A$). The authentication reconstructor 610 may be implemented using similar techniques described above, e.g., via a suitably programmed computing platform and/or suitably configured hardware elements. Regardless of its implementation, the authentication reconstructor 610 solves the following equation:

$$\begin{bmatrix} y_E \\ y_A \end{bmatrix} = \begin{bmatrix} \Phi_E \\ \Phi_A \end{bmatrix} \begin{bmatrix} x_E \\ x_A \end{bmatrix} \qquad \text{Eq. 7}$$

for $x_E$ and $x_A$. As known in the art, techniques other than linear programming, including but not limited to convex programming techniques (such as Second Order Cone Programming) and so-called greedy methods (such as Simultaneous Orthogonal Matching Pursuit) may be equally employed for this purpose. Thereafter, the reconstructed enrollment biometric data and reconstructed authentication biometric data is provided to a comparator 612. The comparator 612 may implement any suitable biometric comparison techniques (and is thus backward- and forward-compatible with any existing or yet-to-be-developed biometric comparison techniques, respectively) capable of taking as input two sets of biometric data and comparing them to determine if they match. As known in the art, such comparisons are often expressed as a confidence parameter (e.g., X % chance that the two biometric data sets are from the same person), which may then be compared against a suitable threshold value to determine whether a match is found.

The result of the comparison (i.e., whether the reconstructed enrollment biometric data and the reconstructed authentication biometric data were sufficiently similar to indicate that they came from the same person) is then provided as an authentication decision 614 (optionally, via the network 620) to the authentication requestor 602 along with the identification of the authenticating user. Thereafter, depending on the authentication decision 614, the authentication requester 602 may provide an indication to the authenticating user whether or not a match was made. As illustrated by the dashed arrow, the authentication decision 614 may also be provided to entities other than the authentication requester 602. For example, the authentication decision 614 may be used by other devices (not shown) to determine whether a sales transaction should be completed or whether a security device (e.g., a door lock) should be inactivated. The myriad uses of the authentication decision 614 will be readily apparent to those of ordinary skill in the art.

As noted above, a strength of the techniques taught by the instant disclosure is the ability to revoke prior transformed biometric data in the event of inadvertent or illicit disclosure and reenrollment of the affected user without a critical loss of biometric data. A system to this end is further described below with reference to FIG. 7. In particular, the system 700 comprises a reenrollment reconstructor 702 in communication with the authentication database 306 and the backup database 310, optionally via an intervening communication network 708 that, once again, may comprise a public or private communication network or combination of elements thereof. Furthermore, the reenrollment reconstructor 702 is in communication with a reenrollment encoder 704 that, in turn, is in communication with another authentication database 706. In the event that, for example, the transformed enrollment biometric data for a given enrolled user is compromised, the reenrollment reconstructor 702 may obtain the enrollment RPT and the transformed enrollment biometric data from the authentication database 306 and the backup RPT and the transformed backup biometric data from the backup database 310. Note that the reenrollment reconstructor 702 may be implemented in the same manner and implement the same techniques described above (including the potential use of encrypted communications or trusted environments to enhance security) relative to the authentication reconstructor 610. With this information, the reenrollment reconstructor 702 can determine reconstructed biometric data (i.e., either a reconstruction of the enrollment biometric data or the backup biometric data) that is subsequently provided to the reenrollment encoder 704.

The reenrollment encoder 704, which may be implemented in the same manner as the other encoders described above, thereafter encodes the reconstructed biometric data using a reenrollment RPT that is not, preferably, equivalent to any of the other RPTs (the enrollment RPT, the backup RPT or the authentication RPT) previously used to encode any biometric data corresponding to the reconstructed biometric data. The resulting transformed reconstructed biometric data and the reenrollment RPT may thereafter be stored in another authentication database 706 as may be desired, for example, in the event that the prior authentication database 306 was compromised. As before, the transformed reconstructed biometric data and the reenrollment RPT is stored in the other authentication database in association with an identification of the reenrolling (previously enrolled) user. Alternatively, or additionally, the transformed reconstructed biometric data and the reenrollment RPT may be stored in the authentication database 306, as illustrated by the dotted line, which may be desirable in the event that the authentication database 306 remains secure and only the enrollment information applicable to the enrolling user was compromised. Regardless, note that the reenrollment system 700 does not require additional input of biometric parameters by the enrolled user; the reenrollment process may be completed entirely on the basis of the original enrollment and backup information.

Figure 8:
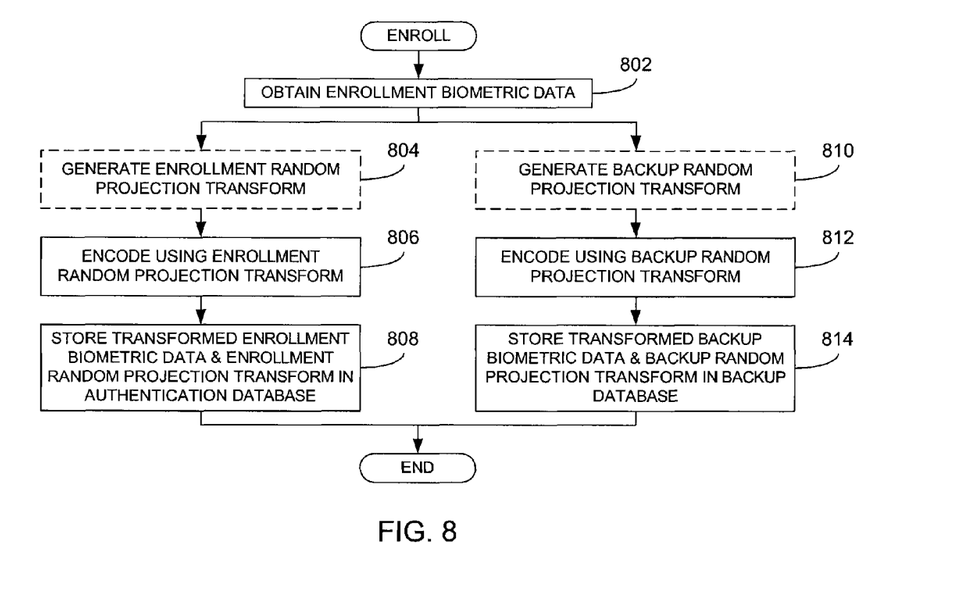
FIG. 8 is a flow chart illustrating enrollment processing in accordance with an embodiment of the instant disclosure.

Referring now to FIG. 8, enrollment processing in accordance with the instant disclosure is further described. The processing illustrated in FIG. 8 is preferably carried out by one or more devices such as those described above, e.g., system 300 illustrated in FIG. 3. Beginning at block 802, enrollment biometric data is obtained, which biometric data may be, for example, any of the types noted above, e.g., fingerprints, facial images, voice recordings, etc. Note that multi-modal biometrics (combinations of different biometric types) may be equally employed. The enrollment biometric data may be obtained from a suitable reader or storage device. Furthermore, as noted above, the enrollment biometric data obtained at block 802 is preferably a single set of biometric data used for both enrollment and backup purposes. However, it is understood that separate enrollment and backup biometric data readings could be employed, presuming that the separate readings are sufficiently similar so as to preserve the correlation of sources fundamental to the Slepian-Wolf construct. Thereafter, processing continues along two parallel paths, as shown.

Along the first path, processing continues at block 804 where an enrollment RPT is optionally generated. As noted above, RPTs may comprise random data in matrix form, the matrix dimensions being determined by the size of the data set established by the enrollment biometric data. Because biometric data sets can be relative large, a large number of unique RPTs may be generated, thereby providing a relatively small likelihood that any two RPTs will be identical. For example, for an iris image, and assuming use of an (M×N) RPT, a value of N=9000 may require a value of M=5000 to meet the above-described criteria. As those having ordinary skill in the art will appreciate, a (5000×9000) matrix of random values could result in millions upon millions of suitable RPTs. In practice, generation of random values is straightforward. For example for an (M×N) matrix, random values may be generated by sampling zero-mean Gaussian random variables with variance 1/M. Techniques for simulating such random variable based, for example, on random seed value, are well known in the art. In this case, each random seed value could corresponds to a different RPT. Note that, instead of generating the enrollment RPT on the fly, as indicated by block 804, a library of RPTs could be generated ahead of time as described and accessed as needed. Regardless of the manner in which the enrollment RPT is obtained, at block 806, the enrollment biometric data is encoded using the enrollment RPT to produce the transformed enrollment biometric data, as described above. The resulting transformed enrollment biometric data and the enrollment RPT are stored, along with an identification of the enrolling user, in an authentication database at block 808.

Along the second path, processing continues at block 810 where a backup RPT (preferably different from the enrollment RPT) is optionally generated (or accessed). Thereafter, at block 812, the enrollment biometric data is encoded using the backup RPT to produce the transformed backup biometric data, as described above. The resulting transformed backup biometric data and the backup RPT are stored, along with an identification of the enrolling user, in a backup database at block 814.

Figure 9:
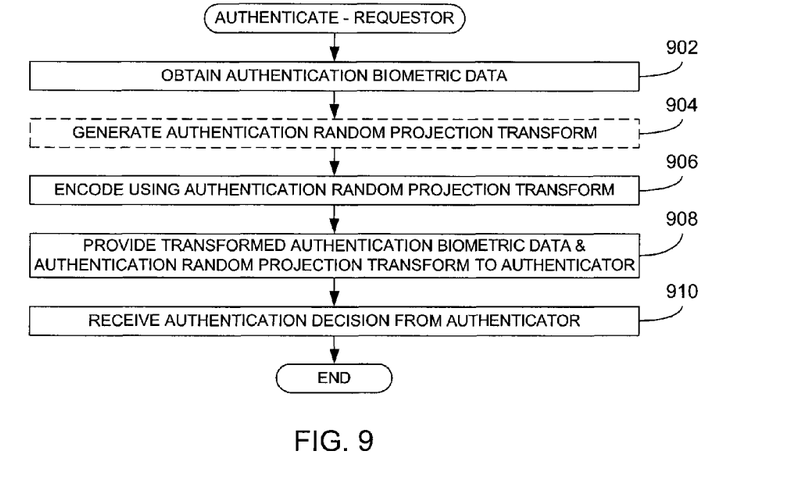
FIG. 9 is a flow chart illustrating authentication processing from the point of view of an authentication requester in accordance with an embodiment of the instant disclosure.

Referring now to FIG. 9, authentication processing by an authentication requester in accordance with the instant disclosure is further described. The processing illustrated in FIG. 9 is preferably carried out by one or more devices similar to those described above, e.g., the authentication requester 602 in FIG. 6. Beginning at block 902, authentication biometric data is obtained, which biometric data may be, for example, any of the types noted above, e.g., fingerprints, facial images, voice recordings, multi-modal combinations, etc., although the authentication biometric data must be of the same type (or types) as the enrollment biometric data. The authentication biometric data may be obtained from a suitable reader or storage device. Processing continues at block 904 where an authentication RPT (preferably different from both the enrollment RPT and the backup RPT) is optionally generated or accessed. Regardless of the manner in which it is obtained, the authentication RPT is used, at block 906, to encode the authentication biometric data. Preferably, once the transformed authentication biometric data has been produced, any copies of the authentication biometric data are discarded so as to prevent any inadvertent disclosure.

Continuing at block 908, the transformed authentication biometric data and corresponding authentication RPT are provided, preferably along with an identification of the enrolled user against whom authentication is sought, to an authenticator at block 908. In one embodiment, the authenticator is a remote device relative to the authentication requestor, e.g., one or more appropriately programmed networked server computers. Thereafter, at block 910, an authentication decision, based in part on the provided transformed authentication biometric data and corresponding authentication RPT, is received from the authenticator. As noted above, the authentication decision comprises an indication whether the authenticating user is the enrolling user.

Figure 10:
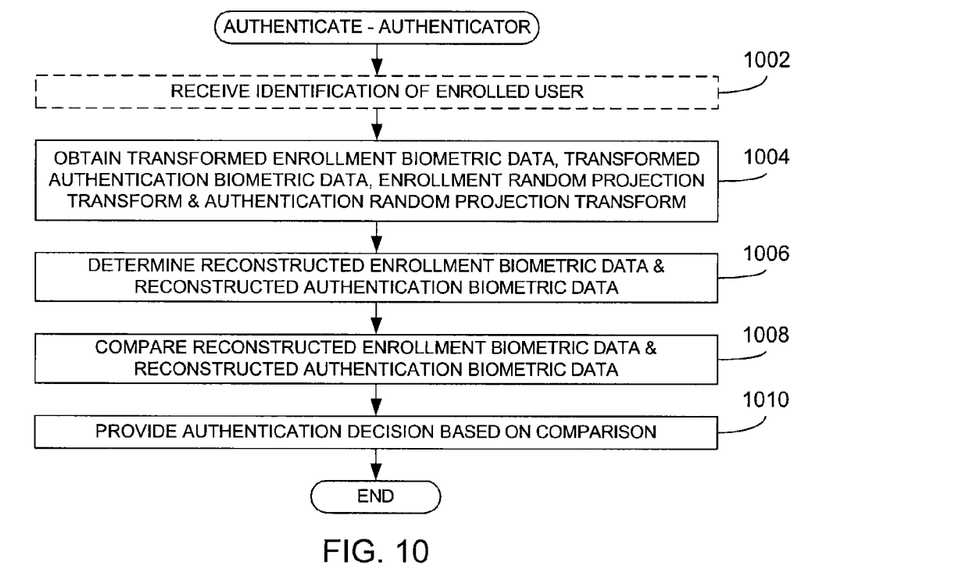
FIG. 10 is a flow chart illustrating authentication processing from the point of view of an authenticator in accordance with an embodiment of the instant disclosure.

Referring now to FIG. 10, authentication processing by an authenticator in accordance with the instant disclosure is further described. The processing illustrated in FIG. 10 is preferably carried out by one or more devices similar to those described above, e.g., the authenticator 604 and authentication database 306 in FIG. 6. Beginning at block 1002, the authenticator optionally receives an identification of an enrolled user. For example, in authentication processing, an identification of an enrolled user as this permits the authenticator to obtain the enrollment information, as described below, for a single person when determining whether or not a match exists. However, for identification processing, where the identify of the user is initially unknown, it is possible that the authenticator could perform comparisons against every enrolled user, seeking to find any match (or plurality of likely/potential matches) to thereby identify the user.

Regardless, at block 1004, the authenticator obtains transformed enrollment biometric data, an enrollment RPT, transformed authentication biometric data and an authentication RPT. As noted above, the transformed authentication biometric data and the authentication RPT may be obtained from an authentication requester, whereas the transformed enrollment biometric data and the enrollment RPT may be obtained from the authentication database (based on the identification of the enrolled user, if provided, or by a progressive search through the authentication database). As described above, the authenticator then applies suitable techniques (linear programming) to the transformed enrollment biometric data, the enrollment RPT, the transformed authentication biometric data and the authentication RPT to determine reconstructed enrollment and authentication biometric data at block 1006. Thereafter, the reconstructed enrollment and authentication biometric data is compared, using any suitable biometric comparison technique at block 1008, and the resulting authentication decision (e.g., match/no match) is thereafter provided to the authentication requestor at block 1010.

Figure 11:
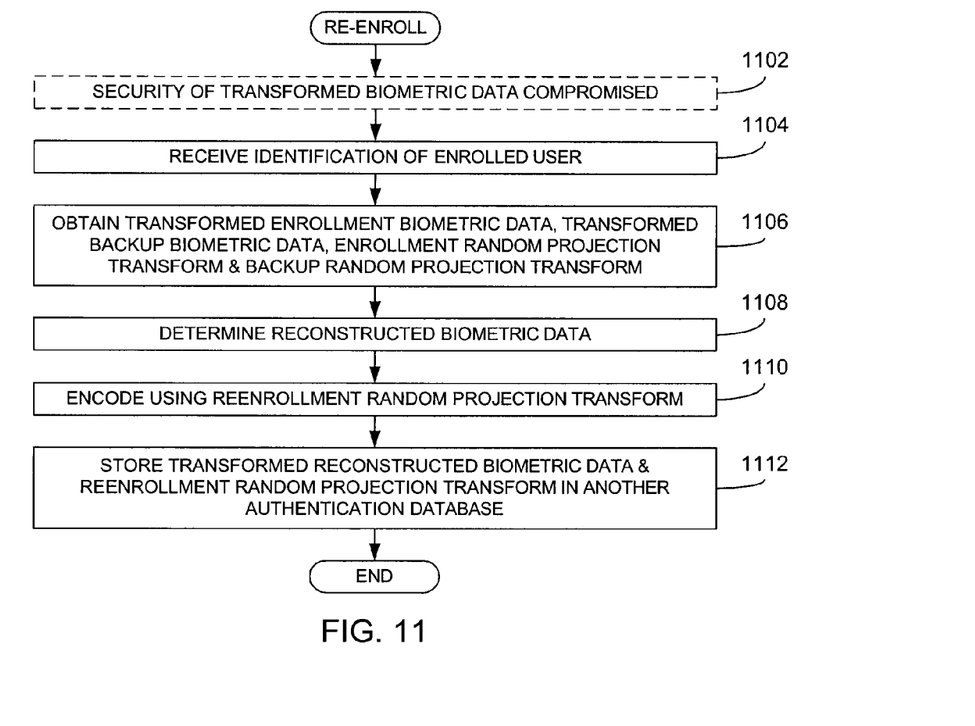
FIG. 11 is a flow chart illustrating reenrollment processing in accordance with an embodiment of the instant disclosure.

With reference to FIG. 11, reenrollment processing in accordance with the instant disclosure is further described. The processing illustrated in FIG. 11 is preferably carried out by one or more devices such as those described above, e.g., system 700 illustrated in FIG. 7. Beginning at block 1102, it is determined that the security of transformed biometric data (most likely, the transformed enrollment biometric data, although this is not a requirement) has been compromised. In response to this determination, the now-compromised transformed biometric data may be revoked to prevent its further use for authentication/security purposes. Any suitable process for rendering transformed biometric data unusable, i.e., revoked, may employed. For example, it may be desirable to delete the encoding RPT associated with the compromised transformed biometric data to ensure that it could not be subsequently decoded. Alternatively, the transformed biometric could be simply marked as revoked such that attempted use of the transformed biometric or its encoding RPT (or slightly perturbed versions thereof) would cause an alarm to issued. Regardless of the revocation technique employed, it is understood that although compromised security of transformed biometric data is a likely reason for revocation, this is not a requirement as revocation may be instituted for other reasons. For example, where the authentication processing described herein is implemented as a fee-based subscription service, revocation may become necessary where an enrolled user fails to maintain a fully paid account. As another example, where selected persons are enrolled for security purposes (e.g., only certain persons are permitted access to a secure facility), it may be necessary to revoke as personnel changes are made.

Regardless of the reason for canceling an enrolled user's transformed biometric data, and assuming the previously enrolled user is to be reenrolled, processing continues at block 1104 where an identification of the enrolled user, subject to the cancellation, is received. Thereafter, at block 1106, the transformed enrollment biometric data, enrollment RPT, transformed backup biometric data and backup RPT corresponding to the identification of the enrolled user are obtained at block 1106, preferably from the authentication and backup databases as described above. Using the previously described techniques, reconstructed biometric data is determined at block 1108 based on the transformed enrollment biometric data, enrollment RPT, transformed backup biometric data and backup RPT. The reconstructed biometric data is then encoded, at block 1110, based on a reenrollment RPT (once again, preferably different from any of the prior enrollment, authentication or backup RPTs used to process any correlated biometric data) to provide transformed reconstructed biometric data. Finally, the transformed reconstructed biometric data and the reenrollment RPT are stored, along with the identification of the enrolling user, in another authentication database (or the original authentication database if security thereof has not been compromised) at block 1112.

As described above, the instant disclosure provides techniques for providing cancelable biometrics. This is achieve through the use of random projection transforms that provide one-way encoding of biometric data, while still allowing the transformed biometric data to be reconstructed as necessary based on Slepian-Wolf/distributed coding principles. By providing a backup version of transformed biometric data, the advantages of joint compression may be leveraged such that compromised transformed biometric data may be canceled in favor of transformed reconstructed biometric data without further user intervention. For at least these reasons, the above-described techniques represent an advancement over prior art teachings.

While particular preferred embodiments have been shown and described, those of ordinary skill in the art will appreciate that changes and modifications may be made without departing from the instant teachings. For example, in an embodiment, the authentication requester may comprise little more than a storage device storing transformed authentication biometric data (previously encoded as described above by an appropriate source). In this case, the authentication database may also include (in addition to the transformed enrollment biometric data and the enrollment RPT) the authentication RPT used to produce the transformed authentication biometric data, i.e., the authentication database includes three of the four necessary pieces (assuming that the enrollment information is not split two or more ways, i.e., J>2, as noted above) needed to reconstruct the biometric data. Here, the process of authentication involves sending the transformed authentication biometric data to the authenticator along with an identification of the targeted enrolled user such that the authenticator then obtains the other three necessary pieces from the authentication database.

In yet another, similar embodiment, the authenticating user possess a storage device having stored thereon the transformed enrollment biometric data, whereas the enrollment RPT is separately stored in the authentication database (along with, of course, the enrolled user's identification). In this case, the authentication requester sends the transformed enrollment biometric data (obtained from the authenticating user's storage device), the transformed authentication biometric data and the authentication RPT to the authenticator along with the enrolled user's identification. Here, the authenticator obtains only the enrollment RPT from the authentication database to complete the required reconstruction.

It is therefore contemplated that any and all modifications, variations or equivalents of the above-described teachings fall within the scope of the basic underlying principles disclosed above and claimed herein.

What is claimed is:

1. A method for processing biometric data, the method comprising:
    obtaining, by a processing device, enrollment biometric data of an enrolling user; and
    encoding, by a processing device, the enrollment biometric data using an enrollment random projection transform to produce transformed enrollment biometric data, wherein the enrollment random projection transform comprises
    a measurement function that is sufficiently incoherent to a basis in which the enrollment biometric data is sparse, and meeting the conditions of:

$m_x + m_y \geq H(X,Y)$;

$m_x \geq H(X|Y)$;

$m_y \geq H(Y|X)$;

$m_x < H(X)$;

$m_y < H(Y)$;

where X is the enrollment biometric data, Y is at least one other biometric data, H(X,Y) is a joint entropy of X and Y, $m_x$ is an encoding rate of the enrollment random projection transform, $m_y$ is an encoding rate of another random projection transform applied to Y, H(X) is an entropy of X expressing a minimum encoding rate needed to reconstruct X, H(Y) is an entropy of Y expressing a minimum encoding rate needed to reconstruct Y, H(X|Y) is a conditional entropy expressing a minimum encoding rate needed to reconstruct X given knowledge of Y and H(Y|X) is a conditional entropy expressing a minimum encoding rate needed to reconstruct Y given X.

2. The method of claim 1, further comprising:
    storing, by the processing device, the transformed enrollment biometric data and the enrollment random projection transform in association with an identification of the enrolling user in an authentication database.

3. The method of claim 1, wherein the enrollment random projection transform comprises a plurality of measurement vectors that are incoherent relative to a basis in which the biometric data is sparse.

4. The method of claim 1, wherein the enrollment biometric data comprises a feature vector that is substantially uniquely descriptive of a biometric characteristic of the enrolling user.

5. The method of claim 1, wherein the enrollment biometric data comprises at least one of an image of a face of the enrolling user, a recording of a voice of the enrolling user, an image of a fingerprint of the enrolling user or an image of an iris of the enrolling user.

6. The method of claim 1, further comprising:
    encoding, by the processing device, the enrollment biometric data using a backup random projection transform to produce transformed backup biometric data, wherein knowledge of the backup random projection transform and the transformed backup biometric data is insufficient to reconstruct the enrollment biometric data.

7. The method of claim 6, further comprising:
    storing, by the processing device, the transformed backup biometric data and the backup random projection transform in association with the identification of the enrolling user in a backup database.

8. A method for processing biometric data, the method comprising:
    obtaining, by a processing device, authentication biometric data of an authenticating user;
    encoding, by the processing device, the authentication biometric data using an authentication random projection transform to produce transformed authentication biometric data, wherein the authentication random projection transform comprises a measurement function that sufficiently incoherent to a basis in which the e authentication biometric data is sparse, and
    meeting the conditions of:

$m^x + m_y \geq H(X,Y)$;

$m_x \geq H(X|Y)$;

$m_y \geq H(Y|X)$;

$m_x < H(X)$;

$m_y < H(Y)$;

where X is the enrollment biometric data Y is at least one other biometric data, H(X,Y) is a joint entropy of X and Y, $m_x$ is an encoding rate of the enrollment random projection transform, $m_y$ is an encoding rate of another random projection transform applied to Y,H(X) is an entropy of X expressing a minimum encoding rate needed to reconstruct X, H(Y) is an entropy of Y expressing a minimum encoding rate needed to reconstruct Y, H(X|Y) is a conditional entropy expressing a minimum encoding rate needed to reconstruct X given knowledge of Y and H(Y|X) is a conditional entropy expressing a minimum encoding rate needed to reconstruct Y given X,
    providing, by the processing device, the authentication random projection transform and the transformed authentication biometric data to an authenticator; and
    receiving, by the processing device from the authenticator, an authentication decision concerning the authenticating user, wherein the authenticating decision is based on the authentication random projection transform and the transformed authentication biometric data.

9. The method of claim 8, wherein providing the authentication random projection transform and the transformed authentication biometric data to the authenticator further comprises:
    receiving, by the processing device, an identification of an enrolling user; and
    providing, by the processing device, the identification of the enrolling user to the authenticator,
    wherein the authentication decision comprises an indication whether the authenticating user is the enrolling user.

10. A method for processing biometric data, the method comprising:
    obtaining, by a processing device, transformed enrollment biometric data, transformed authentication biometric data, an enrollment random projection transform and an authentication random projection transform;
    determining, by the processing device, reconstructed enrollment biometric data and reconstructed authentication biometric data based on the transformed enrollment biometric data, the transformed authentication biometric data, the enrollment random projection transform and the authentication random projection transform;

comparing, by the processing device, the reconstructed enrollment biometric data and the reconstructed authentication biometric data; and providing, by the processing device, an authentication decision based on comparison of the reconstructed enrollment biometric data and the reconstructed authentication biometric data.

11. The method of claim 10, further comprising:

receiving, by the processing device from an authentication requester, an identification of an enrolling user; and obtaining, by the processing device from an authentication database, the transformed enrollment biometric data and the enrollment random projection transform based on the identification of the enrolling user.

12. The method of claim 11, further comprising:

receiving, by the processing device from the authentication requester, the transformed authentication biometric data and the authentication random projection transform.

13. The method of claim 10, wherein the authentication decision comprises an indication that an authenticating user associated with the transformed authentication biometric data is an enrolling user associated with the transformed enrollment biometric data when the reconstructed enrollment biometric data compares favorably with the reconstructed authentication biometric data, or an indication that the authenticating user is not the enrolling user when the reconstructed enrollment biometric data does not compare favorably with the reconstructed authentication biometric data.

14. A method for processing biometric data, the method comprising:

obtaining, by a processing device, transformed enrollment biometric data, transformed backup biometric data, an enrollment random projection transform and a backup random projection transform;

determining, by the processing device, reconstructed biometric data corresponding to an enrolling user based on the transformed enrollment biometric data, the transformed backup biometric data, the enrollment random projection transform and the backup random projection transform; and encoding, by the processing device, the reconstructed biometric data using a reenrollment random projection transform to produce transformed reconstructed biometric data, wherein knowledge of the reenrollment random projection transform and the transformed reconstructed biometric data is insufficient to reconstruct the reconstructed biometric data.

15. The method of claim 14, further comprising, prior to determining the reconstructed biometric data:

determining that security of the transformed enrollment biometric data has been compromised.

16. The method of claim 14, further comprising:

receiving, by the processing device from a reenrollment requester, an identification of the enrolling user; and obtaining, by the processing device, the transformed enrollment biometric data and the enrollment random projection transform from an authentication database based on the identification of the enrolling user; and obtaining, by the processing device, the transformed backup biometric data and the backup random projection transform from a backup database based on the identification of the enrolling user.

17. The method of claim 14, further comprising:

storing, by the processing device, the transformed reconstructed biometric data and the reenrollment random projection transform in association with an identification of the enrolling using in another authentication database.

18. A system for processing biometric data comprising:

an enrollment encoder operative to process enrollment biometric data of an enrolling user using an enrollment random projection to transform to produce transformed enrollment biometric data, wherein the enrollment random projection transform comprises a measurement function that is sufficiently incoherent to a basis in which the enrollment biometric data is sparse, and meeting the conditions of $m^x + m_y \geq H(X,Y);$ $m_x \geq H(X|Y);$ $m_y \geq H(Y|X);$ $m_x < H(X);$ $m_y < H(Y);$ where X is the enrollment biometric data, Y is at least one other biometric data, H(X,Y) is a joint entropy of X and Y, $m_x$ is an encoding rate of the enrollment random projection transform, $m_y$ is an encoding rate of another random projection transform applied to Y, H(X) is an entropy of X expressing a minimum encoding rate needed to reconstruct X, H(Y) is an entropy of Y expressing a minimum encoding rate needed to reconstruct Y, H(X|Y) is a conditional entropy expressing a minimum encoding rate needed to reconstruct X given knowledge of Y and H(Y|X) is a conditional entropy expressing a minimum encoding rate needed to reconstruct Y given X, and an authentication database, in communication with the enrollment encoder, operative to store the transformed enrollment biometric data and the enrollment random projection transform in association with an identification of the enrolling user.

19. The system of claim 18, further comprising:

an enrollment biometric input device, in communication with the enrollment encoder, operative to process a biometric feature of the enrolling user and provide the enrollment biometric data as output, wherein the biometric feature comprises at least one of the enrolling user's: face, voice, fingerprint or iris.

20. The system of claim 18, further comprising:

a backup encoder operative to process the enrollment biometric data using a backup random projection transform to produce transformed backup biometric data, wherein knowledge of the backup random projection transform and the transformed backup biometric data is insufficient to reconstruct the enrollment biometric data; and a backup database, in communication with the backup encoder, operative to store the transformed backup biometric data and the backup random projection transform in association with the identification of the enrolling user.

21. The system of claim 20, wherein the enrollment random projection transform and the backup random projection transform each comprises a plurality of measurement vectors that are incoherent relative to a basis in Which the biometric data is sparse.

22. An system for processing biometric data comprising:

an authentication encoder operative to process authentication biometric data of an authenticating user using an authentication random projection transform to produce transformed authentication biometric data, wherein knowledge of the authentication random projection transform and the transformed authentication biometric data is insufficient reconstruct the authentication biometric data;

an authentication reconstructor, in communication with the authentication encoder, operative to determine reconstructed enrollment biometric data and reconstructed authentication biometric data based on transformed enrollment biometric data, the transformed authentication biometric data, an enrollment random projection transform and the authentication random projection transform; and a comparator, in communication with the authentication reconstructor, operative to compare the reconstructed enrollment biometric data and the reconstructed authentication biometric data and provide an authentication decision based on comparison of the reconstructed enrollment biometric data and the reconstructed authentication biometric data.

23. The apparatus of claim 22, further comprising:
an authentication biometric input device, in communication with the authentication encoder, operative to process a biometric feature of the authenticating user and provide the authentication biometric data as output, wherein the biometric feature comprises at least one of the authenticating user's: face, voice, fingerprint or iris.

24. The apparatus of claim 22, wherein the authentication random projection transform comprises a plurality of measurement vectors that are incoherent relative to a basis in which the biometric data is sparse.

25. The apparatus of claim 22, wherein the authentication reconstructor further comprises:
an input interface, in communication with an authentication database, for obtaining the transformed enrollment biometric data and the enrollment random projection transform.

26. A system for processing biometric data comprising:
an authentication database comprising transformed enrollment biometric data and an enrollment random projection transform associated with an identification of an enrolling user;
a backup database comprising transformed backup biometric data and a backup random projection transform associated with the identification of the enrolling user;
a reenrollment reconstructor, in communication with the authentication database and the backup database, operative to determine reconstructed enrollment biometric data based on the transformed enrollment biometric data, the transformed backup biometric data, the enrollment random projection transform and the backup random projection transform; and
a reenrollment encoder operative to process the reconstructed enrollment biometric data using a reenrollment random projection transform to produce transformed reconstructed biometric data, wherein knowledge of the reenrollment random projection transform and the transformed reconstructed biometric data is insufficient to reconstruct enrollment biometric data.

27. The system of claim 26, further comprising:
another authentication database, in communication with the reenrollment encoder, operative to store the transformed reconstructed biometric data and the reenrollment random projection transform in association with the identification of the enrolling user.

28. The system of claim 26, wherein the reenrollment random projection transform comprises a plurality of measurement vectors that are incoherent relative to a basis in which the biometric data is sparse.

29. An apparatus for processing biometric data comprising:
a processor; and
a processor-readable medium having stored thereon executable instructions that, when executed by the processor, cause the processor to:
obtaining enrollment biometric data of an enrolling user; and
encode the enrollment biometric data using an enrollment random projection transform to produce transformed enrollment biometric data, wherein the enrollment random projection transform comprises a measurement function that is sufficiently incoherent to a basis in which the enrollment biometric data is sparse, and meeting the conditions of
meeting the conditions of:

$$m^x + m_y \geq H(X,Y);$$

$$m_x \geq H(X|Y);$$

$$m_y \geq H(Y|X);$$

$$m_x < H(X);$$

$$m_y < H(Y);$$

where X is the enrollment biometric data, Y is at least one other biometric data, H(X,Y) is a joint entropy of X and Y, $m_x$ is an encoding rate of the enrollment random projection transform, $m_y$ an encoding another random projection transform applied to Y, H(X) is an entropy of X expressing a minimum encoding rate needed to reconstruct X, H(Y) is an entropy of Y expressing a minimum encoding rate needed to reconstruct Y, H(X|Y) is a conditional entropy expressing a minimum encoding rate needed to reconstruct X given knowledge of Y and H(Y|X) is a conditional entropy expressing a minimum encoding rate needed to reconstruct Y given X.

30. The apparatus of claim 29, wherein the processor-readable medium further comprises executable instructions that, when executed by the processor, cause the processor to store the transformed enrollment biometric data and the enrollment random projection transform in association with an identification of the enrolling user in an authentication database.

31. The apparatus of claim 29, wherein the enrollment random projection transform comprises a plurality of measurement vectors that are incoherent relative to a basis in which the biometric data is sparse.

32. The apparatus of claim 29, wherein the processor-readable medium further comprises executable instructions that, when executed by the processor, cause the processor to:
encode the enrollment biometric data using a backup random projection transform to produce transformed backup biometric data, wherein knowledge of the backup random projection transform and the transformed backup biometric data is insufficient to reconstruct the enrollment biometric data.

33. The apparatus of claim 32, wherein the processor-readable medium further comprises executable instructions that, when executed by the processor, cause the processor to:
store the transformed backup biometric data and the backup random projection transform in association with the identification of the enrolling user in a backup database.

34. An apparatus for processing biometric data comprising:
- a processor; and
- a processor-readable medium having stored thereon executable instructions that, when executed by the processor, cause the processor to:
- obtain authentication biometric data of an authenticating user;
- encode the authentication biometric data using an authentication random projection transform to produce transformed authentication biometric data, wherein the authentication random projection transform comprises a measurement function that is sufficiently incoherent to a basis in which the authentication biometric data is sparse, and meeting the conditions of:

$m^x + m_y \geq H(X,Y);$ $m_x \geq H(X|Y);$ $m_y \geq H(Y|X);$ $m_x < H(X);$ $m_y < H(Y);$ where X is the enrollment biometric data, Y is at least one other biometric data, H(X,Y) is a joint entropy of X and Y, $m_x$ is a rate of the enrollment random projection transform, $m_y$ is an encoding rate of another random projection transform applied to Y, H(X) is an entropy of X expressing a minimum encoding rate needed to reconstruct X, H(Y) is an entropy of Y expressing a minimum encoding rate needed to reconstruct Y, H(X|Y) is a conditional entropy expressing a minimum encoding rate needed to reconstruct X given knowledge of Y and H(Y|X) is a conditional entropy expressing a minimum encoding rate needed to reconstruct Y given X,
- providing the authentication random projection transform and the transformed authentication biometric data to an authenticator; and
- receive, from the authenticator, an authentication decision concerning the authenticating user, wherein the authenticating decision is based on the authentication random projection transform and the transformed authentication biometric data.

35. The apparatus of claim 34, wherein the executable instructions that, when executed by the processor, cause the processor to provide the authentication random projection transform and the transformed authentication biometric data to the authenticator further comprise executable instructions that, when executed by the processor, cause the processor to:
- receive an identification of an enrolling user; and
- provide the identification of the enrolling user to the authenticator,
- wherein the authentication decision comprises an indication whether the authenticating user is the enrolling user.

36. An apparatus for processing biometric data comprising:
- a processor; and
- a processor-readable medium having stored thereon executable instructions that, when executed by the processor, cause the processor to:
- obtain transformed enrollment biometric data, transformed authentication biometric data, an enrollment random projection transform and an authentication random projection transform;
- determine reconstructed enrollment biometric data and reconstructed authentication biometric data based on the transformed enrollment biometric data, the transformed authentication biometric data, the enrollment random projection transform and the authentication random projection transform;
- compare the reconstructed enrollment biometric data and the reconstructed authentication biometric data; and
- provide an authentication decision based on comparison of the reconstructed enrollment biometric data and the reconstructed authentication biometric data.

37. The apparatus of claim 36, wherein the processor-readable medium further comprises executable instructions that, when executed by the processor, cause the processor to:
- receive, from an authentication requester, an identification of an enrolling user; and
- obtain, from an authentication database, the transformed enrollment biometric data and the enrollment random projection transform based on the identification of the enrolling user.

38. The apparatus of claim 37, wherein the processor-readable medium further comprises executable instructions that, when executed by the processor, cause the processor to:
- receive, from the authentication requester, the transformed authentication biometric data and the authentication random projection transform.

39. The apparatus of claim 36, wherein the authentication decision comprises an indication that an authenticating user associated with the transformed authentication biometric data is an enrolling user associated with the transformed enrollment biometric data when the reconstructed enrollment biometric data compares favorably with the reconstructed authentication biometric data, or an indication that the authenticating user is not the enrolling user when the reconstructed enrollment biometric data does not compare favorably with the reconstructed authentication biometric data.

40. An apparatus for processing biometric data comprising:
- a processor; and
- a processor-readable medium having stored thereon executable instructions that, when executed by the processor, cause the processor to:
- obtain transformed enrollment biometric data, transformed backup biometric data, an enrollment random projection transform and a backup random projection transform;
- determine reconstructed biometric data corresponding to an enrolling user based on the transformed enrollment biometric data, the transformed backup biometric data, the enrollment random projection transform and the backup random projection transform; and
- encode the reconstructed biometric data using a reenrollment random projection transform to produce transformed reconstructed biometric data, wherein knowledge of the reenrollment random projection transform and the transformed reconstructed biometric data is insufficient to reconstruct the reconstructed biometric data.

41. The apparatus of claim 40, wherein the processor-readable medium further comprises executable instructions that, when executed by the processor, cause the processor to:
- determine that security of the transformed enrollment biometric data has been compromised.

42. The apparatus of claim 40, wherein the processor-readable medium further comprises executable instructions that, when executed by the processor, cause the processor to:

receive, from a reenrollment requester, an identification of the enrolling user; and obtain the transformed enrollment biometric data and the enrollment random projection transform from an authentication database based on the identification of the enrolling user; and obtain the transformed backup biometric data and the backup random projection transform from a backup database based on the identification of the enrolling user.

43. The apparatus of claim 40, wherein the processor-readable medium further comprises executable instructions that, when executed by the processor, cause the processor to:

store the transformed reconstructed biometric data and the reenrollment random projection transform in association with an identification of the enrolling using in another authentication database.

* * * * *